(12) United States Patent
Nguyen et al.

(10) Patent No.: US 11,454,725 B2
(45) Date of Patent: Sep. 27, 2022

(54) METHOD OF DETERMINING THE VERTICAL PROFILE OF THE WIND SPEED UPSTREAM FROM A WIND TURBINE EQUIPPED WITH A LIDAR SENSOR

(71) Applicant: IFP Energies nouvelles, Rueil-Malmaison (FR)

(72) Inventors: Hoai-Nam Nguyen, Rueil-Malmaison (FR); Fabrice Guillemin, Rueil-Malmaison (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 130 days.

(21) Appl. No.: 16/906,105

(22) Filed: Jun. 19, 2020

(65) Prior Publication Data
US 2020/0400836 A1    Dec. 24, 2020

(30) Foreign Application Priority Data

Jun. 19, 2019 (FR) ..................................... 1906569

(51) Int. Cl.
| | | |
|---|---|---|
| *F03D 7/04* | (2006.01) | |
| *G01S 17/95* | (2006.01) | |
| *F03D 17/00* | (2016.01) | |
| *G01S 17/58* | (2006.01) | |

(52) U.S. Cl.
CPC .............. *G01S 17/95* (2013.01); *F03D 17/00* (2016.05); *G01S 17/58* (2013.01); *F05B 2200/22* (2013.01); *F05B 2260/84* (2013.01); *F05B 2270/32* (2013.01); *F05B 2270/8042* (2013.01)

(58) Field of Classification Search
CPC .......... G01S 17/95; G01S 17/58; F03D 17/00; F05B 2200/22; F05B 2260/84; F05B 2270/32; F05B 2270/8042
See application file for complete search history.

(56) References Cited

U.S. PATENT DOCUMENTS

| | | | |
|---|---|---|---|
| 2015/0145253 A1 | 5/2015 | Bayon et al. | |
| 2015/0176566 A1* | 6/2015 | Ruiz Aldama | .......... F03D 7/024 416/1 |
| 2017/0350369 A1* | 12/2017 | Evans | ................... G05B 13/027 |

(Continued)

FOREIGN PATENT DOCUMENTS

| | | |
|---|---|---|
| FR | 3013777 A1 | 5/2015 |
| WO | 2018234409 A1 | 12/2018 |

OTHER PUBLICATIONS

Preliminary Search Report for FR 19/06.569, dated Feb. 19, 2020 (2 pages).

(Continued)

*Primary Examiner* — Mohamed Charioui
*Assistant Examiner* — Christine Y Liao
(74) *Attorney, Agent, or Firm* — Fitch, Even, Tabin & Flannery LLP

(57) ABSTRACT

The invention relates to a method of determining the vertical profile of the wind speed upstream from a wind turbine (1), wherein wind speed measurements are performed by a LiDAR sensor (2), then the exponent $\alpha$ of the power law is determined by an unscented Kalman filter and measurements, and the exponent $\alpha$ is applied to the power law in order to determine the vertical wind speed profile.

5 Claims, 3 Drawing Sheets

(56) References Cited

U.S. PATENT DOCUMENTS

2019/0085823 A1* 3/2019 Hovgaard .............. G05B 17/02
2021/0399546 A1* 12/2021 Menon .................... H02J 3/003

OTHER PUBLICATIONS

Cho A et al: "Wind Estimation and Airspeed Calibration Using the UAV with a Single-Antenna GNSS Receiver and Airspeed Sensor", GNSS 2006—Proceedings of the 19th International Technical Meeting of the Satellite Division of the Institute of Navigation (ION GNSS 2006), The Institute of Navigation, 8551 Rixlew Lane Suite 360 Manassas, VA 20109, USA, Sep. 29, 2006 (Sep. 29, 2006), pp. 3050-3058.

P. Towers et al: "Real-time wind field reconstruction from LiDAR measurements using a dynamic wind model and state estimation : LiDAR wind field estimation", WI ND ENERGY,vol. 19, No. 1,Nov. 21, 2014 (Nov. 21, 2014), pp. 133-150, XP055451329.

* cited by examiner

[Fig 1]
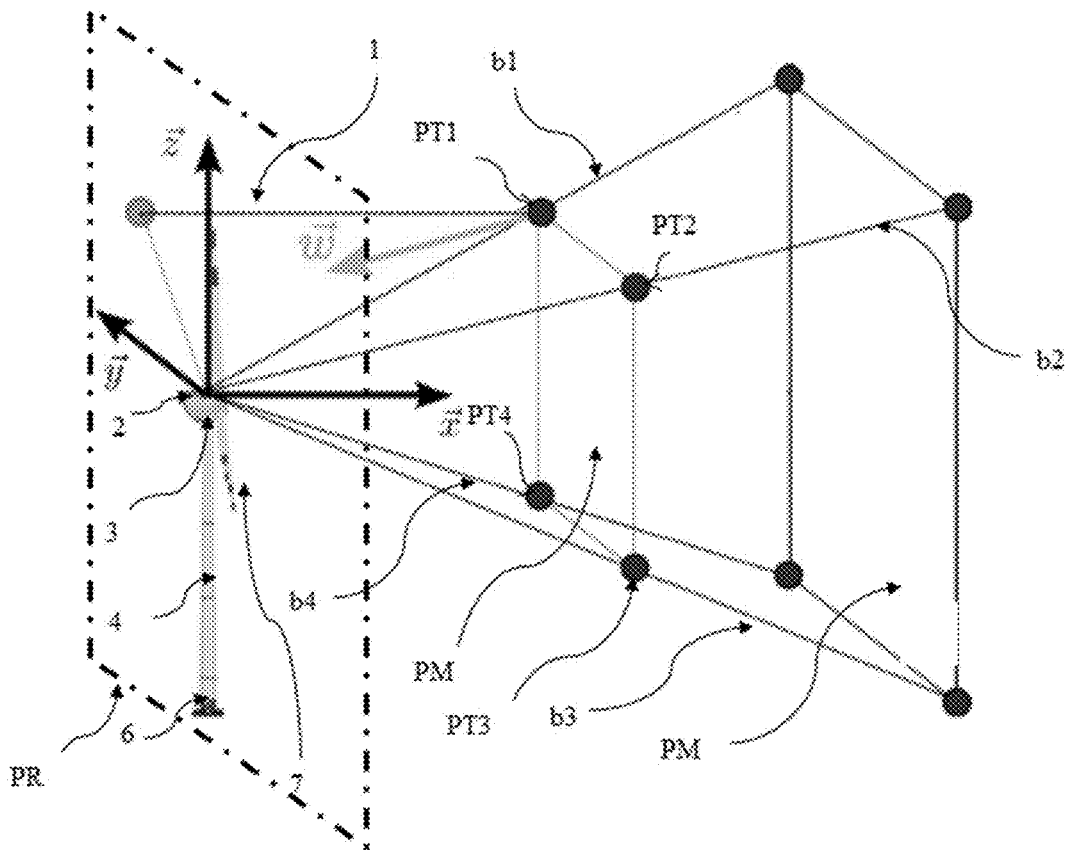
[Fig 2]
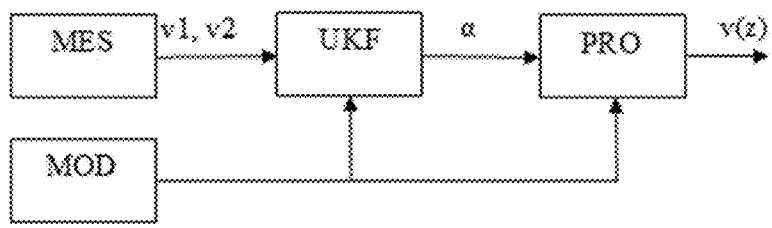
[Fig 3]
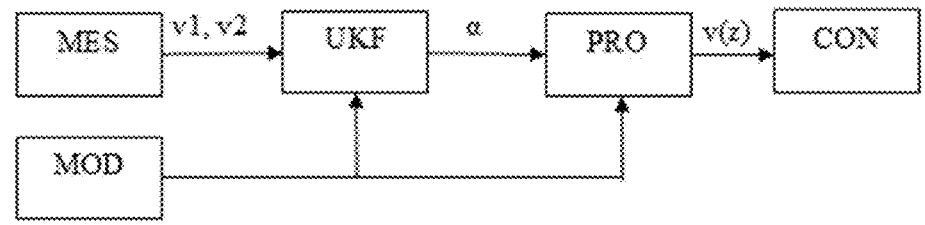

[Fig 4]
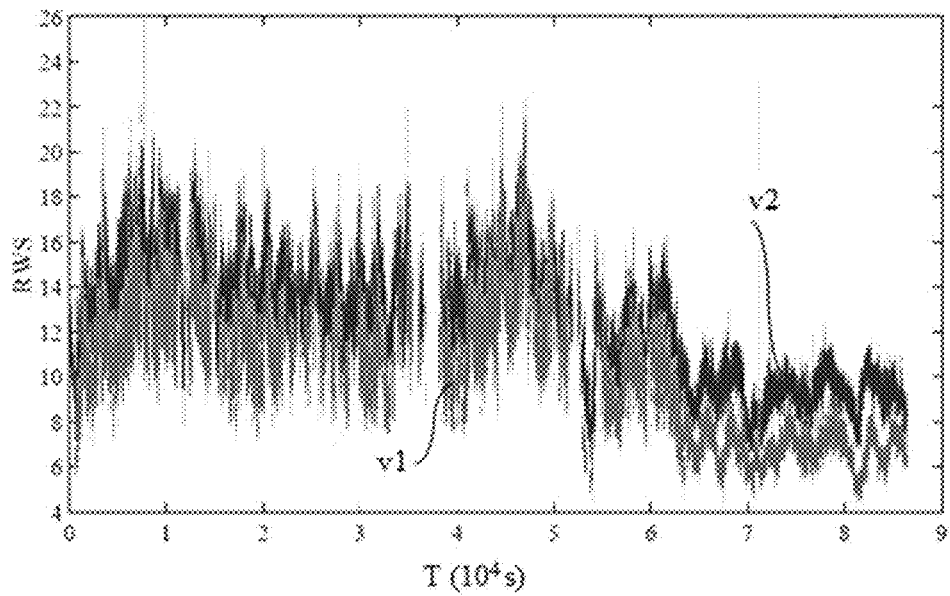
[Fig 5]
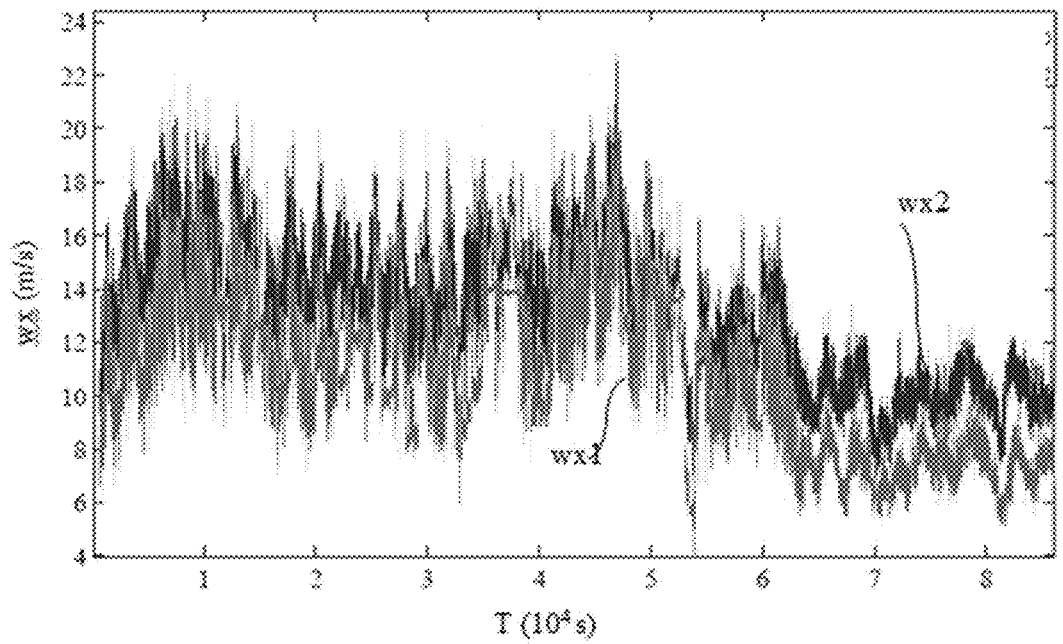

[Fig 6]
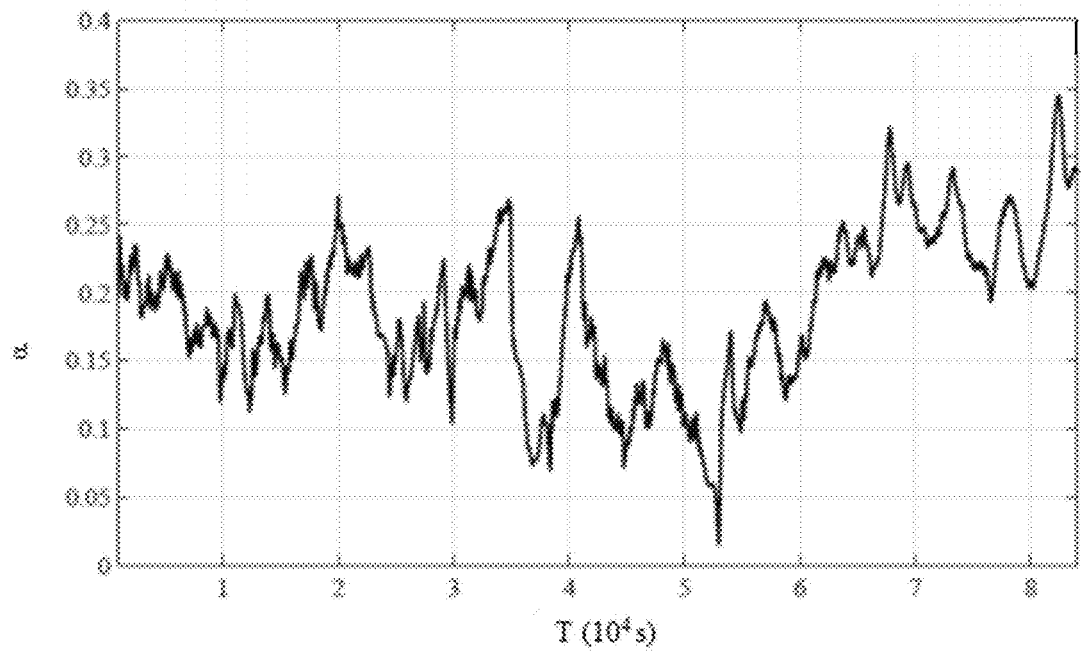
[Fig 7]
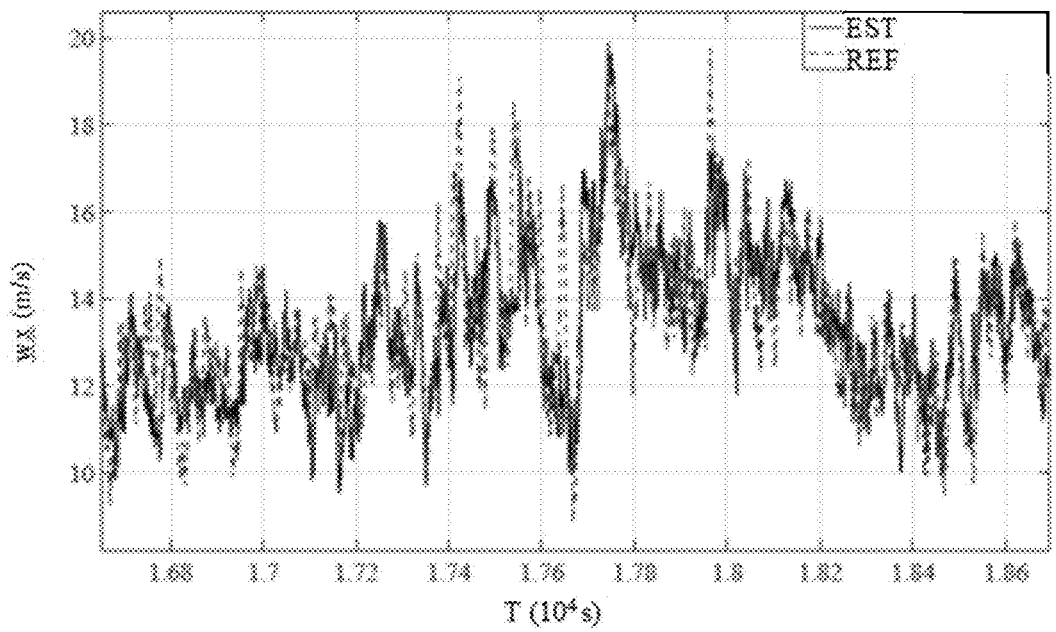

METHOD OF DETERMINING THE VERTICAL PROFILE OF THE WIND SPEED UPSTREAM FROM A WIND TURBINE EQUIPPED WITH A LIDAR SENSOR

BACKGROUND OF THE INVENTION

Field of the Invention

The present invention relates to the field of renewable energies and more particularly to the measurement of the resource of wind turbines, i.e. the wind, with wind prediction, turbine control (orientation, torque and speed regulation) and/or diagnosis and/or monitoring objectives.

A wind turbine allows the kinetic energy from the wind to be converted into electrical or mechanical energy. For conversion of wind to electrical energy, it is made up of the following elements:
- a tower allowing a rotor to be positioned at a sufficient height to enable motion thereof (necessary for horizontal-axis wind turbines) and/or this rotor to be positioned at a height enabling it to be driven by a stronger and more regular wind than at ground level. The tower generally houses part of the electric and electronic components (modulator, control, multiplier, generator, etc.);
- a nacelle mounted at the top of the tower, housing mechanical, pneumatic and some electric and electronic components necessary to operate the machine. The nacelle can rotate so as to orient the machine in the right direction;
- a rotor fastened to the nacelle, comprising several blades (generally three) and the hub of the wind turbine. The rotor is driven by wind power and it is connected by a mechanical shaft, directly or indirectly (via a gearbox and mechanical shaft system), to an electric machine (electric generator) that converts the energy recovered to electrical energy. The rotor is potentially provided with control systems such as a variable-angle blade control system or an aerodynamic brake control system; and
- a transmission made up of two shafts (mechanical shaft of the rotor and mechanical shaft of the electric machine) connected by a transmission (gearbox).

Since the beginning of the 1990s, there has been renewed interest in wind power, in particular in the European Union where the annual growth rate is about 20%. This growth is attributed to the inherent possibility for carbon-emission-free electricity generation. In order to sustain this growth, the energy yield of wind turbines still has to be further improved. The prospect of wind power production increase requires developing effective production tools and advanced control tools in order to improve the performance of the machines. Wind turbines are designed to produce electricity at the lowest possible cost. They are therefore generally built so as to reach their maximum performance at a wind speed of approximately 15 m/s. It is not necessary to design wind turbines that maximize their yield at higher wind speeds, which are not common. In case of wind speeds above 15 m/s, it is necessary to lose part of the additional energy contained in the wind so as to avoid damage to the wind turbine. All wind turbines are therefore designed with a power regulation system.

For this power regulation, controllers have been designed for variable-speed aerogenerators. The purpose of the controllers is to maximize the electric power recovered, to minimize the rotor speed fluctuations, and to minimize the fatigue and the extreme moments of the structure (blades, tower and platform).

To optimize control, it is important to know the wind speed at the rotor of the wind turbine. Various techniques have been developed to that end.

According to a first technique, using an anemometer allows estimating a wind speed at one point, but this imprecise technology does not enable measuring an entire wind field or to know the three-dimensional components of the wind speed or to know the vertical wind speed profile.

According to a second technique, a LiDAR (Light Detection And Ranging) sensor can be used. LiDAR is a remote sensing or optical measurement technology based on the analysis of the properties of a beam returned to the emitter. This method is notably used for determining the distance to an object by a pulse laser. Unlike radars based on a similar principle, LiDAR sensors use visible or infrared light instead of radio waves. The distance to an object or a surface is given by the measurement of the delay between the pulse and the detection of the reflected signal.

In the field of wind turbines, LiDAR sensors are essential for proper functioning of large wind turbines, especially now that their size and power is increasing (today 5 MW, soon 12 MW for offshore turbines). This sensor enables remote wind measurements, first allowing wind turbines to be calibrated so that they can deliver maximum power (power curve optimization). For this calibration stage, the sensor can be positioned on the ground and vertically oriented (profiler), which allows measuring the wind speed and direction, as well as the wind gradient depending on the altitude. This application is particularly critical because it allows knowing the energy generating resource. This is important for wind turbine projects since it conditions the financial viability of the project. However, this method may appear to be costly because it requires a LiDAR sensor fixedly arranged on the ground or the sea and vertically oriented, in addition to the LiDAR sensor provided on the wind turbine for the application described below.

A second application sets this sensor on the nacelle of the wind turbine in order to measure the wind field in front of the turbine while being nearly horizontally oriented. A priori, measuring the wind field in front of the turbine allows knowing in advance the turbulence the wind turbine is going to encounter shortly thereafter. However, current wind turbine control and monitoring techniques do not allow accounting for a measurement performed by a LiDAR sensor by estimating precisely the wind speed at the rotor in the rotor plane. Such an application is notably described in patent application FR-3-013,777 corresponding to US published application 2015/145,253.

The wind speed varies as a function of altitude with the wind being stronger at a high altitude than at ground level. Knowing the vertical wind speed profile, in other words the wind speed gradient as a function of altitude, is useful in various wind turbine control applications. See Wagner, Rozenn & Antoniou, Ioannis & M. Pedersen, SØren & Courtney, Michael & JØrgensen, Hans. (2009). The Influence of the Wind Speed Profile on Wind Turbine Performance Measurements. Wind Energy. 12. 348-362. 10.1002/we.297 notably describes the relation between the wind speed profile and the wind turbine performances. According to examples, this vertical wind speed profile can be used in wind turbine energy evaluations or for controlling the pitch angle of the turbine blades.

Conventionally, the vertical wind speed profile used by LiDAR sensor manufacturers is obtained by offline applied methods based on the batch processing approach. These methods are therefore not suited for estimating the vertical wind speed profile in real time.

Furthermore, other methods for determining the vertical wind speed profile use mathematical representations thereof, among which are the logarithmic profile or the power law.

The logarithmic wind profile was created from a model of the turbulent boundary layer on a flat plate by Prandtl. It was subsequently found to be valid in an unmodified form in strong wind conditions in the atmospheric boundary layer near the ground or sea surface. On the surface, the logarithmic wind profile is then given by:

$$v_z = \frac{v_*}{\kappa} \ln \frac{z}{z_0} - \psi_m$$

where vz is the longitudinal wind speed at the height z, v* is the friction velocity, k=0.41 is the von Karman constant, z0 is the surface roughness and ψm is the diabatic correction of the vertical wind speed profile. This logarithmic profile depends only on constant and is imprecise at high altitude and is difficult to calibrate. Furthermore, this logarithmic profile is less precise than the power law.

The power law is written as follows:

$$\frac{v_z}{v_{z0}} = \left(\frac{z}{z_0}\right)^\alpha$$

with vz being the longitudinal wind speed at the height z, z0 being the reference height, vz0 being the longitudinal wind speed at the reference height z0 and a being the exponent of said power law.

The power law is generally used in wind energy evaluations, where the wind speed at the height of a wind turbine needs to be estimated from wind observations near the surface, or when wind speed data at different heights needs to be adjusted to a standard height. In relation to the logarithmic law, the power law can be readily integrated over a height. This profile is widely used for engineering purposes due to its simplicity. Assuming neutral atmospheric conditions, it is well known that the power law produces more precise predictions for the wind speed than the logarithmic law, at heights ranging from 100 m to the upper part of the atmospheric boundary layer. For normal wind conditions on offshore sites (at sea), exponent α is set at 1/7. However, when a constant exponent is used, it does not account for the variation as a function of time and the surface roughness. Furthermore, it does not take into account the displacement of the winds from the surface due to the presence of obstacles, such as the wind turbine in the present case. Using a constant exponent can therefore produce erroneous estimates of the vertical wind speed profile.

SUMMARY OF THE INVENTION

The present invention notably determines, in real time, a precise vertical wind speed profile in a simple manner. The invention therefore relates to a method of determining the vertical profile of the wind speed upstream from a wind turbine, wherein wind speed measurements are performed by a LiDAR sensor, then the exponent α of the power law is determined by use of an unscented Kalman filter and measurements, and the exponent α is applied to the power law in order to determine the vertical wind speed profile.

The invention relates to a method of determining the vertical profile of the wind speed upstream from a wind turbine which is equipped with a LiDAR sensor facing upstream of the wind turbine, wherein the following steps are carried out:

a) measuring the wind speed in at least one measurement plane upstream from the wind turbine at least at two measurement points located at different heights by the LiDAR sensor;

b) constructing a model of the vertical wind speed profile by a power law of the form:

$$\frac{v_z}{v_{z0}} = \left(\frac{z}{z_0}\right)^\alpha$$

with vz being the longitudinal wind speed at the height z, z0 is the reference height, vz0 is the longitudinal wind speed at the reference height z0 and a is the exponent of the power law;

c) determining the exponent α of the power law by use of an unscented Kalman filter using the wind speed measurements at the two measurement points; and d) determining the vertical wind speed profile by applying the determined exponent α to the model of the vertical wind speed profile.

According to an embodiment of the invention, the unscented Kalman filter is applied to a state model comprising additive noise and multiplicative noise.

Advantageously, the state model is written:

$$\begin{cases} x(k) = x(k-1) + \eta(k-1), \\ y(k) = (v_2(k) + \epsilon_2(k))\left(\frac{z_1}{z_2}\right)^{x(k)} - \epsilon_1(k) \end{cases}$$

with x(k)=a(k) being the state variable at time k, y(k)=v1(k) being the output of the state model corresponding to the longitudinal wind speed measured at time k at measurement point 1, n(k−1) being the variation of exponent α at time k−1, v2(k) being the longitudinal wind speed measured at time k at measurement point 2, z1 being the height of measurement point 1, z2 being the height of measurement point 2, ε1(k) being the noise of speed v1 at time k, and ε2(k) the noise of speed v2 at time k.

Preferably, for applying the Kalman filter, the increasing random variable $x_a$ is considered:

$$x_a(k) = \begin{bmatrix} x(k) \\ \epsilon_2(k) \end{bmatrix}$$

with x(k)=a(k) being the state variable at time k and ε2(k) being the noise of speed v2 at time k.

According to an aspect, the exponent α of the power law is determined by carrying out the following steps:

i) initializing k=0, the state vector being $\hat{x}_a(0|0)$=m(0) and the state of the covariance matrix being P(0|0)=$P_0$;

ii) at any time k, acquiring the wind speed measurements v1(k) and v2(k) at measurement points 1 and 2, with y(k)=v1(k); and iii) at any time k, determining the exponent α of the power law by use of the following equations:

$$\begin{cases} K(k) = P_{xy}P_{yy}^{-1} \\ x(k\,|\,k) = x(k\,|\,k-1) + K(k)(v_1(k) - m_y) \\ P(k\,|\,k) = P(k\,|\,k-1) - K(k)P_{yy}K(k)^T \end{cases}$$

with K being the Kalman filter gain, Pxy being the state-measurement cross-covariance, Pyy being the predicted measurement covariance, my being the predicted output mean, $v1(k)$ being the longitudinal wind speed measured at time k at measurement point 1.

Furthermore, the invention relates to a method of controlling a wind turbine equipped with a LiDAR sensor, wherein the following steps are carried out:

a) determining the vertical wind speed profile upstream from the wind turbine by use of the method according to one of the above features; and b) controlling the wind turbine as a function of the vertical wind speed profile upstream from the wind turbine.

The invention further relates to a computer program product comprising code instructions for carrying out the steps of a method according to one of the above features, when the program is executed on a processor of the LiDAR sensor.

Moreover, the invention relates to a LiDAR sensor for a wind turbine. It comprises a processor which implements a method according to one of the above features.

Moreover, the invention relates to a wind turbine comprising a LiDAR sensor according to one of the above features with the LiDAR sensor preferably being mounted on the nacelle of the wind turbine or in the hub of the wind turbine.

BRIEF DESCRIPTION OF THE DRAWINGS

Other features and advantages of the method according to the invention will be clear from reading the description hereafter of embodiments given by way of non-limitative example, with reference to the accompanying drawings wherein:

FIG. 1 illustrates a wind turbine equipped with a LiDAR sensor according to an embodiment of the invention;

FIG. 2 illustrates the steps of the method of determining the vertical wind speed profile according to an embodiment of the invention;

FIG. 3 illustrates the steps of the wind turbine control method according to a second embodiment of the invention;

FIG. 4 is a curve of the measured radial wind speed at two heights, 200 m upstream from the wind turbine, as a function of time, for one example;

FIG. 5 is a curve of the estimated longitudinal wind speed at two heights, 200 m upstream from the wind turbine, as a function of time, for the example of FIG. 4;

FIG. 6 is an example of variation curve of exponent α as a function of time for the example of FIG. 4; and FIG. 7 is a curve of the longitudinal speed estimated with the method according to an embodiment of the invention (from the measurements of the example of FIG. 4) and measured 100 m upstream from the wind turbine, as a function of time.

DETAILED DESCRIPTION OF THE INVENTION

The present invention relates to a method of determining the vertical profile of the wind speed upstream from a wind turbine (the notion of "upstream" is defined according to the direction of the wind towards the turbine). The vertical wind speed profile is understood to be the wind speed gradient as a function of altitude. The determined vertical wind speed profile allows determining the vertical wind variation upstream from the wind turbine and at the turbine rotor plane. According to the invention, the wind turbine is equipped with a LiDAR sensor arranged substantially horizontally to measure the wind speed upstream from the turbine.

According to the invention, the LiDAR sensor allows measuring the wind speed in at least one measurement plane upstream from the wind turbine. There are several types of LiDAR sensors, for example scanning LiDAR, continuous wave LiDAR or pulsed LiDAR sensors. Within the context of the invention, a pulsed LiDAR sensor is preferably used. However, the other LiDAR technologies may also be used while remaining within the scope of the invention.

LiDAR sensors allow fast measurement. Therefore, using such a sensor enables fast, continuous and real-time determination of the vertical wind speed profile. For example, the sampling rate of the LiDAR sensor can range between 1 and 5 Hz (or even more in the future), and it can be 4 Hz. Furthermore, the LiDAR sensor obtains information relative to the wind upstream from the wind turbine, which information is related to the wind flowing towards the turbine. The LiDAR sensor can therefore be used to determine the vertical wind speed profile.

FIG. 1 schematically shows, by way of non-limitative example, a horizontal-axis wind turbine 1 equipped with a LiDAR sensor 2 for the method according to an embodiment of the invention. LiDAR sensor 2 is used to measure the wind speed at a given distance in measurement planes PM (only two measurement planes are shown). Knowing the wind measurement in advance a priori allows providing much information. This figure also shows axes x, y and z. The reference point of this coordinate system is the center of the rotor. Direction x is the longitudinal direction corresponding to the direction of the rotor axis, upstream from the wind turbine, this direction also corresponds to the measurement direction of LiDAR sensor 2. Direction y, perpendicular to direction x, is the lateral direction located in a horizontal plane (directions x, y form a horizontal plane). Direction z is the vertical direction (substantially corresponding to the direction of tower 4) pointing up, and axis z is perpendicular to axes x and y. The rotor plane is indicated by the rectangle in dotted line PR, which is defined by directions y, z for a zero value of x. Measurement planes PM are planes formed by directions y, z at a distance from rotor plane PR (for a non-zero value of x). Measurement planes PM are parallel to rotor plane PR.

Conventionally, a wind turbine 1 converts the kinetic energy of the wind into electrical or mechanical energy. To convert the wind energy to electrical energy, the turbine has the following elements:

a tower 4 allowing a rotor (not shown) to be positioned at a sufficient height to enable motion thereof (necessary for horizontal-axis wind turbines) and/or allowing this rotor to be positioned at a height enabling it to be driven by a stronger and more regular wind than at ground level 6. Tower 4 generally houses part of the electric and electronical components (modulator, control, multiplier, generator, etc.);

a nacelle 3 mounted at the top of tower 4 which houses mechanical, pneumatic and some electrical and electronic components (not shown) necessary for operating the machine. Nacelle 3 can rotate to orient the machine in the right direction;

the rotor, fastened to the nacelle, comprises several blades 7 (generally three) and the hub of the wind turbine. The rotor is driven by the energy from the wind and it is connected by a mechanical shaft, directly or indirectly (via a gearbox and mechanical shaft system), to an electrical machine (electric generator) (not shown) that converts the recovered energy to electrical energy. The rotor is potentially provided with control systems such as a variable-angle blades control system or an aerodynamic brakes control system, a transmission made up of two shafts (mechanical shaft of the rotor and mechanical shaft of the electrical machine) connected by a transmission (gearbox) (not shown).

As can be seen in FIG. 1, which is an example embodiment of a pulsed LiDAR sensor, the LiDAR sensor 2 used comprises four beams or measurement axes (b1, b2, b3, b4). By way of non-limitative example, the method according to the invention also operates with a LiDAR sensor comprising any number of beams. The LiDAR sensor performs a timely measurement at each measurement point (PT1, PT2, PT3, PT4), which are points of intersection of a measurement plane PM and a beam (b1, b2, b3, b4). These measurement points (PT1, PT2, PT3, PT4) are represented by black circles in FIG. 1. Processing the measurements at these measurement points (PT1, PT2, PT3, PT4) allows determination of the wind speed in measurement planes PM and at several heights with measurement points PT1 and PT2 being at an height above that of measurement points PT3 and PT4. The wind modelling method described in French patent application FR-3,068,139 (WO-2018/234,409) can therefore notably be applied.

Preferably, LiDAR sensor 2 can be mounted on nacelle 3 of wind turbine 1 or in the hub of wind turbine 1.

According to the invention, the method of determining the vertical wind speed profile upstream from the wind turbine comprises the following steps:
1) measuring the wind speed;
2) constructing a vertical wind speed profile model;
3) determining exponent α; and
4) determining the vertical wind speed profile.

These steps are carried out in real time. The step of constructing the vertical wind speed profile model can be carried out beforehand and offline.

FIG. 2 schematically illustrates, by way of non-limitative example, the steps of the method of determining the vertical wind speed profile according to an embodiment of the invention. The first step is a step (MES) which measures the wind speed v1, v2 in at least one measurement plane at two different heights by use of the LiDAR sensor. A vertical wind speed profile model (MOD) is constructed. The next step determines exponent α of the vertical wind speed profile model (MOD) by use of an unscented Kalman filter (UKF) and of wind speed measurements v1, v2. The determined exponent α is used with the vertical wind speed profile model (MOD) to determine (PRO) the vertical profile of the wind speed v(z).

1. Wind Speed Measurement

In this step, the wind speed is continuously measured in at least one measurement plane distant from the wind turbine, by the LiDAR sensor, at least at two measurement points located at different heights. Thus, the wind speed can be known upstream from the wind turbine in at least one measurement plane at two different heights. The height of the measurement points is considered along the vertical axis (axis z of FIG. 1) in relation to the ground level or the sea level. In this step, the wind speed can be measured for example at measurement point PT1 ("upper" point) and at measurement point PT3 ("lower" point) of FIG. 1.

According to an implementation of the invention, the measurement planes can be at a longitudinal distance (along axis x in FIG. 1) preferably ranging between 50 and 400 m from the rotor plane. It is thus possible to determine the evolution of the wind speed over a long distance upstream from the wind turbine, which also allows increasing the precision in determining the vertical wind speed profile.

Alternatively, the measurement planes may be closer or further away than the preferred range.

According to a non-limitative example embodiment, the LiDAR sensor can perform measurements for ten measurement planes, which can notably be located at distances of 50, 70, 90, 100, 110, 120, 140, 160, 180 and 200 m from the rotor plane respectively.

According to an embodiment of the invention, wind speed measurements can be performed at several measurement points at each height. For example, the wind speed can be measured at the two measurement points PT1, PT2 ("upper" points) and at the two measurement points PT3, PT4 ("lower" points). In this case, the wind speed measured at one height can be a combination (the average for example) of the wind speed measurements at this height.

In order to increase the precision of the next steps, the wind speed can be measured in several measurement planes.

According to an implementation of the invention, the LiDAR sensor can allow measurement of the radial speed (along the axis of the LiDAR sensor measurement beam). In this case, the method can comprise determining the longitudinal speed (along axis x of FIG. 1) from the radial speed, by any known method, notably by projecting the radial speed onto the longitudinal axis, or by use of a wind reconstruction method, as described for example in patent application FR-3,068,139 (WO-2018/234,409).

2. Constructing the Wind Speed Model

This step constructs a vertical wind speed profile model by a power law (or any equivalent law) of the form:

$$\frac{v_z}{v_{z_0}} = \left(\frac{z}{z_0}\right)^\alpha$$

with vz being the longitudinal wind speed at the height z, z0 being the reference height, vz0 being the longitudinal wind speed at the reference height z0 and α being the exponent of the power law.

The method according to the invention allows determining the variations over time of exponent α in order to make the wind speed model precise. One advantage of the power law is the simplicity thereof. Furthermore, the power law produces more precise wind speed predictions than the logarithmic law, in particular at heights ranging from 100 m to the upper part of the atmospheric boundary layer.

3. Determining Exponent α

This step determines exponent α of the power law by use of an unscented Kalman filter (UKF) and of wind speed measurements performed at the measurement points. The unscented Kalman filter is a filtering algorithm that uses a system model for estimating the current hidden state of a system, then it corrects the estimation using the available sensor measurements. The philosophy of UKF differs from the extended Kalman filter in that it uses the unscented transform to directly approximate the mean and the covariance of the target distribution. The unscented Kalman filter can comprise the steps of state prediction and measurement correction. These two steps are preceded by a prior step of calculating the "sigma points". The sigma points are a set of samples calculated to allow the mean and covariance information to be propagated precisely through the space of a nonlinear function.

Such a filter is thus well suited for rapidly determining exponent α of the power law.

According to an embodiment of the invention, the unscented Kalman filter can be applied to a state model comprising additive noise and multiplicative noise. Additive and multiplicative noises come from the wind speed measurements at different heights. The noise is referred to as additive because it appears to be a term added to the state model. The noise is referred to as multiplicative because it appears to be a term multiplying the input of the state model. This embodiment allows precise determination of exponent α of the power law.

Advantageously, the state model can be written:

$$\begin{cases} x(k) = x(k-1) + \eta(k-1), \\ y(k) = (v_2(k) + \epsilon_2(k))\left(\frac{z_1}{z_2}\right)^{x(k)} - \epsilon_1(k) \end{cases}$$

with $x(k)=a(k)$ being the state variable at time k, $y(k)=v1(k)$ being the output of the state model corresponding to the longitudinal wind speed measured at time k at measurement point 1, $n(k-1)$ being the variation of exponent α at time $k-1$, $v2(k)$ being the longitudinal wind speed measured at time k at measurement point 2, z1 being the height of measurement point 1, z2 being the height of measurement point 2, $\epsilon 1(k)$ being the noise of speed v1 at time k, and $\epsilon 2(k)$ being the noise of speed v2 at time k. For this state model, $\epsilon 1(k)$ is the additive noise and $\epsilon 2(k)$ is the multiplicative noise.

In order to determine exponent α by use of the unscented Kalman filter, the increasing random variable xa can be considered:

$$x_a(k) = \begin{bmatrix} x(k) \\ \epsilon_2(k) \end{bmatrix}$$

with $x(k)=a(k)$ being the state variable at time k and $\epsilon 2(k)$ being the noise of speed v2 at time k.

According to an implementation of the invention, exponent α of the power law can be determined by carrying out the following steps:
i) initializing k=0, the state vector $\hat{x}_a(0|0)=m(0)$ and the state of the covariance matrix $P(0|0)=P_0$;
ii) at any time k, acquiring the wind speed measurements v1(k) and v2(k) at measurement points 1 and 2, with y(k)=v1(k); and
iii) at any time k, determining the exponent α of the power law by use of the following equations:

$$\begin{cases} K(k) = P_{xy}P_{yy}^{-1} \\ x(k|k) = x(k|k-1) + K(k)(v_1(k) - m_y) \\ P(k|k) = P(k|k-1) - K(k)P_{yy}K(k)^T \end{cases}$$

with K being the Kalman filter gain, Pxy being state-measurement cross-covariance, Pyy being the predicted measurement covariance, my being the predicted output mean, v1(k) being the longitudinal wind speed measured at time k at measurement point 1.

According to an embodiment of the invention, the unscented Kalman filter can be used by use of the various steps described below.

$x(k|k-1)$ is the estimation of x(k) from the measurements of time k−1.

$x(k|k)$ is the estimation of x( ) from the measurements of time k.

$P(k|k-1)$ is the error variance from the measurements of time k−1.

$P(k|k)$ is the error variance from the measurements of time k
Q is the variance of the system noise n(k).

Since the equation is linear, the prediction step can be written:

$x(k|k-1)=x(k-1|k-1)$ $P(k|k-1)=P(k-1|k-1)+Q$

Things get more complicated for the correction step due to the presence of both additive and multiplicative noises. To overcome this problem, the following increasing random variable can be considered:

$$x_a(k) = \begin{bmatrix} x(k) \\ \epsilon_2(k) \end{bmatrix}$$

After the prediction step, the distribution of the increasing random variable xa(k) can be given as a normal distribution denoted by N:

$$x_a(k|k-1) \sim N(m_{xa}, P_{xa})$$

with:

$$m_{xa} = \begin{bmatrix} x(k|k-1) \\ 0 \end{bmatrix},$$

$$P_{xa} = \begin{bmatrix} P(k|k-1) & 0 \\ 0 & R_2(k) \end{bmatrix}$$

with $R2(k)$ being the variance of noise $\epsilon 2(k)$ of speed v2 at time k.

The sigma points denoted by XO, Xi, Xi+n associated with mean mxa and covariance matrix Pxa can be calculated as follows:

$$\begin{cases} \chi_0 = m_{xa} \\ \chi_i = m_{xa} + \sqrt{n+\lambda}\, S_i, \ i = \overline{1,n} \\ \chi_{i+n} = m_{xa} - \sqrt{n+\lambda}\, S_i, \ i = \overline{1,n} \end{cases}$$

where n=2, S is a square root of Pxa and $\lambda = \mu^2(n+\kappa) - n$ with μ being a scalar parameter determining the dispersion of the sigma points and κ being a secondary resize parameter.

$X_{i,x}$ and $X_{i,\varepsilon}$ can then be defined as the first and second components of Xi. The sigma points are propagated through the measurement model in the following form, for any i ranging between 1 and 2n:

$$y_i(k) = (v_2(k) + \chi_{i,\varepsilon})\left(\frac{z_1}{z_2}\right)^{\chi_{i,x}}$$

The next step calculates the predicted mean my, the predicted measurement covariance Pyy and the state-measurement cross-covariance Pxy.

$$\begin{cases} m_y = \sum_{i=0}^{2n} W_i^m y_i(k), \\ P_{yy} = \sum_{i=0}^{2n} W_i^c (y_i - m_y)(y_i - m_y)^T + R_1(k) \\ P_{xy} = \sum_{i=0}^{2n} W_i^c (\chi_{i,x} - x(k|k-1))(y_i - m_y)^T \end{cases}$$

with $R1(k)$ being the variance of noise $\varepsilon 1(k)$ of speed v1 at time k, $W_i^m$ and $W_i^c$ being weights defined by:

$$W_0^m = \frac{\lambda}{(\lambda + n)}$$

$$W_i^m = \frac{1}{2(\lambda + n)}$$

$$W_0^c = \frac{1}{(\lambda + n)} + 1 - \mu^2 + \xi$$

$$W_i^c = \frac{1}{2(\lambda + n)}$$

with $\xi$ being a parameter used for incorporating any prior knowledge of the distribution of the increasing random variable $x_a$.

The Kalman filter gain, the state estimation and the covariance matrix at time k can then be expressed as:

$$\begin{cases} K(k) = P_{xy} P_{yy}^{-1} \\ x(k|k) = x(k|k-1) + K(k)(v_1(k) - m_y) \\ P(k|k) = P(k|k-1) - K(k)P_{yy}K(k)^T \end{cases}$$

Given that $x(k)=\alpha$, these equations allow determination of exponent $\alpha$ of the power law, which is variable over time.

4) Determining the Vertical Wind Speed Profile

This step determines the vertical profile of the wind speed upstream from the wind turbine, using the vertical wind speed profile model constructed in step 2) with exponent $\alpha$ being determined in step 3). Thus, the method according to the invention allows determination of the wind speed at any point in space upstream from the wind turbine.

Preferably, the method according to the invention allows determining the longitudinal wind speed at any point in space upstream from the wind turbine.

According to an embodiment of the invention, we can consider in the power law reference z0 to be as the height of any measurement point of the LiDAR sensor (which may be different from the measurement points used in step 1)) and speed vz0 being the wind speed measured at the measurement point being considered. The vertical wind speed profile can thus be determined in the measurement plane by applying the power law.

Alternatively, we can consider in the power law any reference z0 (a point in the rotor plane for example) and speed vz0 as the wind speed estimated (reconstructed) at the point considered. It is thus possible to determine the wind speed in any plane in space, including the rotor plane. To reconstruct the wind speed, any wind reconstruction method may be applied, notably the method described in patent application FR-3,068,139 (WO-2018/234,409), whose main steps are reminded hereafter:

gridding the space upstream from the LiDAR sensor, the grid comprising estimation points and measurement points;

measuring the wind amplitude and direction at the various measurement points;

estimating the wind amplitude and direction at any time for all of the estimation points using a recursive least-squares method for a cost function (also referred to as objective function); and reconstructing the incident wind field in three dimensions and in real time over all of the discretized points.

The present invention also relates to a method of controlling a wind turbine equipped with a LiDAR sensor. The following steps are carried out for this method:

determining the vertical wind speed profile upstream from the wind turbine by the method of determining the vertical wind speed profile according to any one of the above variants; and controlling the wind turbine according to the vertical wind speed profile upstream from the wind turbine.

Precise real-time prediction of the vertical profile of the wind speed upstream from the wind turbine allows suitable wind turbine control in terms of minimization of the effects on the turbine structure and maximization of the recovered power. Indeed, by use of this control, the LiDAR allows anticipation of the speed of the wind flowing towards the turbine by use of these predictions, and thus enables phase advance adaptation of the turbine equipments so that, at the estimated wind arrival time, the turbine is in the optimum configuration for this wind. Moreover, the LiDAR sensor allows reducing the loads on the structure, with the blades and the tower representing 54% of the cost. Therefore, using a LiDAR sensor allows optimizing the wind turbine structure and thus decreasing the costs and maintenance.

According to an implementation of the invention, the inclination angle of the blades and/or the electrical recovery torque of the wind turbine generator can be controlled as a function of the wind speed. Preferably, the individual inclination angle of the blades can be controlled. Other types of regulation devices can also be used. Controlling the blade inclination allows optimizing energy recovery as a function of the incident wind on the blades.

According to an embodiment of the invention, the inclination angle of the blades and/or the electrical recovery torque can be determined by use of wind turbine maps as a function of the wind speed at the rotor. For example, the control method described in patent application FR-2,976,630 A1 corresponding to US published patent application 2012/0321,463 can be applied.

FIG. 3 schematically illustrates, by way of non-limitative example, the steps of the wind turbine control method according to an embodiment of the invention. The first step is step (MES) which measures the wind speed v1, v2 in at least one measurement plane at two different heights by use of the LiDAR sensor. A vertical wind speed profile model (MOD) is constructed. The next step determines the exponent $\alpha$ of the vertical wind speed profile model (MOD) using an unscented Kalman filter (UKF) and wind measurements v1, v2. The exponent α which is thus determined is used with the vertical wind speed profile model (MOD) to determine (PRO) the vertical profile of the wind speed v(z). The vertical profile of the wind speed v(z) is then used for controlling (CON) the wind turbine.

Furthermore, the invention is a computer program product comprising code instructions for performing the steps of one of the methods described above (method of determining the vertical wind speed profile, control method). The program is executed on a processor of the LiDAR sensor, or on any similar medium connected to the LiDAR sensor or to the wind turbine.

According to an aspect, the present invention also relates to a LiDAR sensor for a wind turbine, comprising a processing configured to implement one of the methods described above (method of determining the vertical wind speed profile, control method).

According to an implementation of the invention, the LiDAR sensor can be a scanning LiDAR, a continuous wave LiDAR or a pulsed LiDAR sensor. Preferably, the LiDAR sensor is a pulsed LiDAR sensor.

The invention also relates to a wind turbine, notably an offshore (at sea) or an onshore (on land) wind turbine equipped with a LiDAR sensor as described above. According to an embodiment of the invention, the LiDAR sensor can be arranged on the nacelle of the wind turbine or in the hub of the wind turbine. The LiDAR sensor is so oriented to perform a measurement of the wind upstream from the wind turbine (i.e. before the wind turbine and along the longitudinal axis thereof, designated by axis x in FIG. 1). According to an embodiment, the wind turbine can be similar to the wind turbine illustrated in FIG. 1.

For the embodiment of the control method, the wind turbine can comprise a control, for example for controlling of the inclination angle (or pitch angle) of at least one blade of the wind turbine or of the electrical torque, for implementing the method according to the invention.

EXAMPLE

The features and advantages of the method according to the invention will be clear from reading the application example hereafter.

For this example, the wind speed is estimated at a point upstream from the wind turbine, from the vertical wind speed profile determined with the method according to an embodiment of the invention. For a distance of 200 m upstream from the wind turbine, the wind speeds are therefore measured at two measurement points located at different heights to estimate, in real time, the exponent α of the power law, using the method according to an embodiment of the invention. Then, for a distance of 100 m upstream from the wind turbine, the determined vertical wind speed profile is applied with exponent α to determine the longitudinal wind speed at a predetermined height by use of a measurement of the longitudinal wind speed at a known height.

A 4-beam pulsed LiDAR performing measurements in measurement planes located 100 m and 200 m away from the wind turbine is considered for this example.

FIG. 4 shows the radial wind speed RWS in m/s (in the direction of the measurement beam) measured for two measurement points (which may correspond to measurement points PT1 and PT3 of FIG. 1) as a function of time T in 104 s for one day of measurement. This radial wind speed is measured in a measurement plane 200 m upstream from the wind turbine. The measured speed v1 in light grey corresponds to the speed measured at the lowest measurement point. The measured speed v2 in dark grey corresponds to the speed measured at the highest measurement point. As expected, the speed measured at the highest measurement point is greater than the speed measured at the lowest measurement point. In this figure, it is noted that the LiDAR sensor does not provide measurements at any time, due to a blade blocking effect.

FIG. 5 is a curve of the longitudinal wind speed wx in m/s (in direction x in FIG. 1) as a function of time T in 104 s, corresponding to one day of measurement. Longitudinal wind speed wx is estimated from the radial wind speed RWS of FIG. 4. This longitudinal speed is estimated in a measurement plane 200 m upstream from the wind turbine. The longitudinal speed wx1 in light grey corresponds to the longitudinal speed estimated at the lowest measurement point. The longitudinal speed wx2 in dark grey corresponds to the longitudinal speed estimated at the highest measurement point.

Exponent α of the power law is determined from these speeds, by use of the method according to the invention. FIG. 6 is a curve of exponent α of the power law as a function of time T in 104 s. It can be seen that exponent α varies significantly, therefore the prior art assumption that considers a constant exponent α is not realistic and does not allow precise determine the vertical profile of the wind speed.

The LiDAR sensor also measures the wind speed in the measurement plane located 100 m upstream from the wind turbine, at two known heights. In order to show the precise character of the method according to the invention, on the one hand the wind speed measurement at the highest point at 100 m is considered to be as a reference and on the other hand the wind speed at the highest measurement point at 100 m is estimated by use of the method according to the invention, from the wind speed at the lowest measurement point at 100 m and exponent α determined in FIG. 6 with the wind speed measurements at 200 m. FIG. 7 is a curve of the longitudinal wind speed wx in m/s (i.e. in direction x in FIG. 1) at the highest measurement point as a function of time T in 104 s. This longitudinal speed is estimated in a measurement plane 100 m upstream from the wind turbine. Curve REF corresponds to the reference defined above and curve EST corresponds to the estimation by use of the method according to the invention as defined above. It can be noted that the curves are very close, which shows that the method according to the invention enables precise determination of the wind speed.

The invention claimed is:

1. A method of determining a vertical profile of wind speed upstream from a wind turbine, the vertical profile of wind speed being a wind speed gradient as a function of altitude, the wind turbine being equipped with a rotor and a LiDAR sensor facing upstream from the wind turbine and controlling the wind turbine comprising:
 a) measuring the wind speed with the LIDAR sensor in at least one measurement plane of the rotor upstream from the wind turbine located at least at two measurement points at different heights;
 b) constructing a model of the vertical wind speed profile using a power law of a form:

$$\frac{v_z}{v_{z_0}} = \left(\frac{z}{z_0}\right)^\alpha$$

with vz being longitudinal wind speed at height z, z0 being a reference height, vz0 being a longitudinal wind speed at the reference height z0 and α being an exponent of the power law;

c) determining the exponent α of the power law by use of an unscented Kalman filter by using wind speed measurements from the at least two measurement points, wherein the unscented Kalman filter being applied to a state model comprising additive noise and multiplicative noise, the state model being written as:

$$\begin{cases} x(k) = x(k-1) + \eta(k-1), \\ y(k) = (v_2(k) + \epsilon_2(k))\left(\dfrac{z_1}{z_2}\right)^{x(k)} - \epsilon_1(k) \end{cases}$$

with $x(k)=\alpha(k)$ defining a state variable at time k, $y(k)=v1(k)$ being an output of the state model corresponding to wind speed measured at time k at measurement point 1, $\eta(k-1)$ is variation of exponent α at time k−1, $v2(k)$ is the wind speed measured at time k at measurement point 2, z1 is height of measurement at point 1, z2 is height of measurement and point 2, $\epsilon1(k)$ is noise of speed v1 at time k, and $\epsilon2(k)$ is noise of speed v2 at time k;

d) determining the vertical wind speed profile upstream from the wind turbine by applying the determined exponent α to the model of the vertical wind speed profile to determine vertical wind speed variation upstream from the wind turbine in the at least one measurement plane of the rotor; and e) controlling the wind turbine as a function of the determined vertical wind speed profile upstream from the wind turbine.

2. A method of determining the vertical profile of the wind speed as claimed in claim 1, wherein, an increasing random variable xa is applied to the Kalman filter which is defined as:

$$x_a(k) = \begin{bmatrix} x(k) \\ \epsilon_2(k) \end{bmatrix}$$

with $x(k)=\alpha(k)$ with the state variable being at time k and $\epsilon2(k)$ being noise of speed v2 at time k.

3. A method of determining the vertical profile of the wind speed as claimed in claim 1, wherein the exponent α of the power law is determined by steps of:

i) initializing k=0, a state vector $\hat{x}_a(0|0)=m(0)$ and a state of a covariance matrix $P(0|0)=P_0$;

ii) ii) at any time k, acquiring wind speed measurements $v1(k)$ and $v2(k)$ at measurement points 1 and 2, with $y(k)=v1(k)$; and iii) at any time k, determining the exponent α of the power law by equations:

$$\begin{cases} K(k) = P_{xy}P_{yy}^{-1} \\ x(k \mid k) = x(k \mid k-1) + K(k)(v_1(k) - m_y) \\ P(k \mid k) = P(k \mid k-1) - K(k)P_{yy}K(k)^T \end{cases}$$

with K being Kalman filter gain, Pxy being state-measurement cross-covariance, Pyy being predicted measurement covariance, my being predicted output mean, $v1(k)$ being longitudinal wind speed measured at time k at measurement point 1, P(k|k−1) being error variance from measurements at time k−1, and P(k|k) being error variance from the measurements of time k.

4. A LiDAR sensor for a wind turbine, comprising a processor implementing the method of claim 1.

5. A wind turbine, comprising the LiDAR sensor of claim 1, which is located either at a nacelle of the wind turbine or at a hub of the wind turbine.

* * * * *